Dec. 16, 1941.    A. I. PEDERSEN    2,266,440
AUTOMATICALLY CONTROLLED INTERMITTENT DRIVE
Filed June 21, 1939

INVENTOR
AXEL I. PEDERSEN
BY
ATTORNEY

Patented Dec. 16, 1941

2,266,440

UNITED STATES PATENT OFFICE 2,266,440

AUTOMATICALLY CONTROLLED INTERMITTENT DRIVE

Axel I. Pedersen, Brooklyn, N. Y.

Application June 21, 1939, Serial No. 280,278

2 Claims. (Cl. 192—28)

This invention relates to intermittent drives for use in connection with various types and kinds of machines or apparatus wherein it is desirable to intermittently actuate a driven shaft for the operation of predetermined mechanism or to intermittently break the drive of a driven shaft to intermittently stop the operation thereof; and the object of the invention is to provide a drive mechanism of the character described involving a unit readily attachable and detachable with respect to a machine or apparatus and placed in operative engagement therewith through a chain, belt or other drive, with means positively placing a driven shaft in operative connection with the drive with automatically or manually operated means cooperating with the last named means to break the driving connection between the drive shaft and the driven shaft; a still further object being to provide a unit or attachment of the character described which is arranged within a casing or housing facilitating the lubrication of the parts and forming a protector therefor; a further object being to provide an intermittent drive wherein a cam pawl is employed and supported upon a disc or wheel arranged adjacent and in operative engagement with a constantly driven ratchet wheel with means movable into and out of engagement with the path of movement of said cam pawl for declutching the pawl with respect to said ratchet wheel and for braking and retarding the rotary movement of said disc or wheel and means in operative engagement therewith; a still further object being to provide a unit of the character described employing a drive sleeve freely rotatable upon a shaft; the latter being driven by said sleeve through the medium of the pawl cam employed; and with these and other objects in view, the invention consists in a variable drive mechanism of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which.

Figure 1:
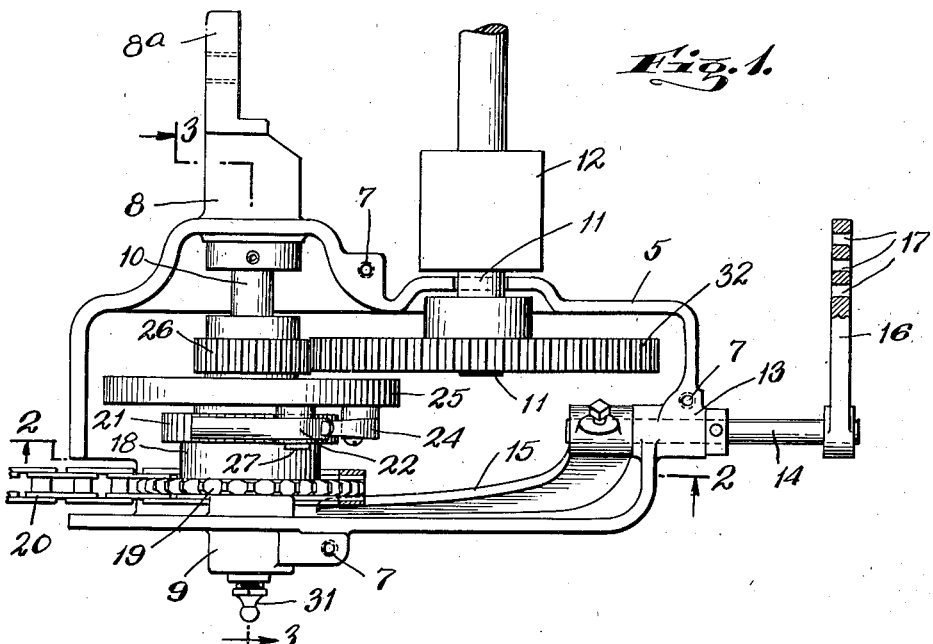
Fig. 1 is a plan view of a drive mechanism made according to my invention showing the cover of the mechanism removed.

In the present illustration of one adaptation of my invention I have shown at 5 the bottom casing part of a drive mechanism, and at 6 the top or cover part secured to the casing 5 by screws or other devices at the points indicated at 7, note Fig. 1. The casing part has at one end portion thereof opposed bearings 8 and 9 for a driven shaft 10, the bearing 8 being extended as seen at 8a to form a supporting bracket portion by means of which the attachment may be secured to or adjacent a suitable machine or apparatus in connection with which the drive mechanism or unit is to be employed. The casing 5 and cover 6 are apertured at the other end portion to receive a supplemental driven or output shaft 11, which may be suitably supported as indicated at 12. The shaft 11 is arranged upon the parting line of the casing and cover to facilitate attachment and detachment of the shaft 11 or of the attachment as a whole. The last named end portion of the casing 5 is provided with another bearing 13 for a rocker shaft 14, supporting within the casing a trip finger or device 15. At the outer end of the shaft 14 is a control or operating lever 16 which may have a number of apertures 17 therein to adjustably couple an operating link or lever therewith in the automatic control and operation of the finger 15 as will later appear.

The first named end portion of the casing 5 as well as the cover 6 are apertured as seen at 5a, 6a, to permit the free passage of a chain, belt, or other driving medium into the casing to engage and actuate a drive sleeve 18 which is freely rotatable upon the shaft 10. In the construction shown, the sleeve 18 has a sprocket wheel portion 19 to receive a drive chain 20, the latter being actuated through any suitable driving means at spaced relation to the shaft 10. In other words, in various types of automatic machines and apparatus, the chain 20 may be driven from any drive or driven shaft of the apparatus which is suitable for the purpose, or of course, the drive may come direct from a motor driven shaft.

The sprocket 19 is arranged at one end of the sleeve 18; and secured to the other end thereof is a ratchet wheel 21 through the medium of which and a cam pawl 22 the shaft 10 may be driven when the end 23 of the pawl is held in engagement with the ratchet wheel 21 by a spring 24. The pawl 22 as well as the spring 24 are supported upon a disc or wheel 25 secured to a pinion 26 which is keyed or otherwise coupled with the shaft 10. The pawl 22 is pivoted to the disc 25 as seen at 27; whereas the spring 24 is supported as seen at 24a. The pawl 22 has an outwardly projecting cam and brakeshoe portion 28 which is curved in the manner illustrated in Fig. 2 of the drawing, so that the free end 28a is closer to the axis 10 than the rounded portion 28b, whereby the end 28a of the pawl is free to pass over the rounded end 15a of the trip finger or release 15 in the operation of automatically declutching the end 23 of the pawl from the ratchet wheel 21 against the action of the spring 24.

A collar 29 is secured to the shaft 10 within the casing 5 to maintain alinement of the parts within the casing intermediate the bearings 8 and 9. One end of the shaft 10 is apertured to form oil grooves 30; and a fitting 31 is provided in said end of the shaft through which lubricating oil or grease may be introduced into the casing, especially to lubricate the sleeve 18. It will be understood that this lubrication will extend along the shaft to provide sufficient lubrication for the entire mechanism.

Secured to the shaft 11 within the casing 5 is a large gear 32 which meshes with the pinion 26 whereby in the operation of said pinion, the shaft 11 will be driven through the gear 32 to actuate any mechanism, device or apparatus on or coupled with the shaft 11, depending entirely upon the use to which the drive mechanism is intended. At this point it is well to call attention to the fact that the ratio of gearing between the gears 26 and 32 may be varied to suit different requirements.

Figure 3:
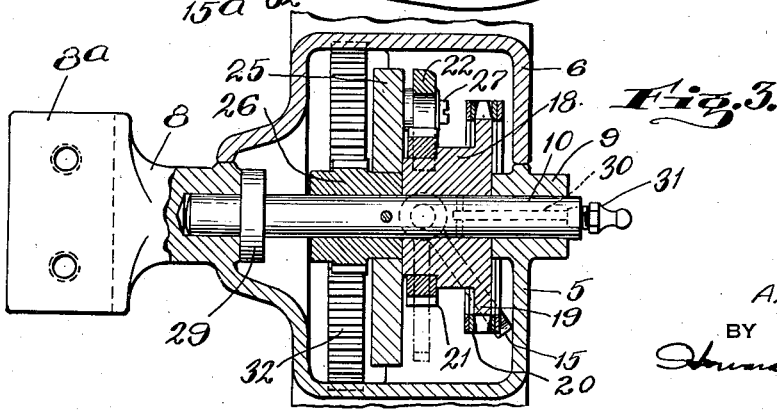
Fig. 3 is a section substantially on the line 3—3 of Fig. 1.

One method of utilizing a drive of the character described would be in providing intermittent one-cycle rotations of the driven shaft 10 with corresponding rotation to the output driven shaft 11, depending upon the ratio of gearing provided. In this adaptation of the invention, the trip finger 15 will be normally supported in the path of rotary movement of the pawl 22; that is to say, in the dotted line position indicated in Fig. 3 of the drawing. Assuming that the pawl is in engagement with the finger 15, supporting the pawl out of engagement with the ratchet wheel 21, the drive sleeve 18 will then be driven to rotate freely about the shaft 10. When it is desired to provide a single rotation of the shaft 10, the lever 16 will be lowered, thus moving the finger 15 into the full line position shown in Figs. 1 and 3, releasing the pawl 22 so that the end 23 thereof will move into engagement with one of the teeth of the ratchet wheel 21. The disc 25 will thus be driven through the pawl which will rotate the shaft 10 and the pinion 26 as well as the gear 32 and shaft 11. Immediately after releasing the pawl, the finger 15 may be returned to its operative position and as the pawl again approaches the end 15a of the lever, the pawl will be declutched or disengaged from the ratchet wheel and the drive to the shaft 10 and shaft 11 will be stopped. This action will be broken by the camming surface 28b acting upon the end 15a of the finger 15 in the manner of a brake-shoe and but one rotation of the shaft 10 will result.

It will, of course, be understood that through any automatic control governing the operation of the lever 16, the finger 15 may be supported in an inoperative position for any number of revolutions or partial revolutions of the shaft 11, and then moved into the path of the revolving pawl to stop the rotation of the shaft 11, at least within one cycle of rotation of the shaft 10. It will also be understood that any method of operation or control of operation would consist in providing a constant drive of the shaft 11 by maintaining the finger 15 in inoperative position at all times, and then through the operation of the lever 16, the rotation of the shaft 11 may be stopped by moving the finger into the tripping and braking position. In certain installations or adaptations of the invention, it may also be desirable to provide other means for breaking the rotation of the driven shaft, but such breaking mechanisms are old and known, in the art, and for this reason no illustration thereof is deemed necessary.

Figure 2:
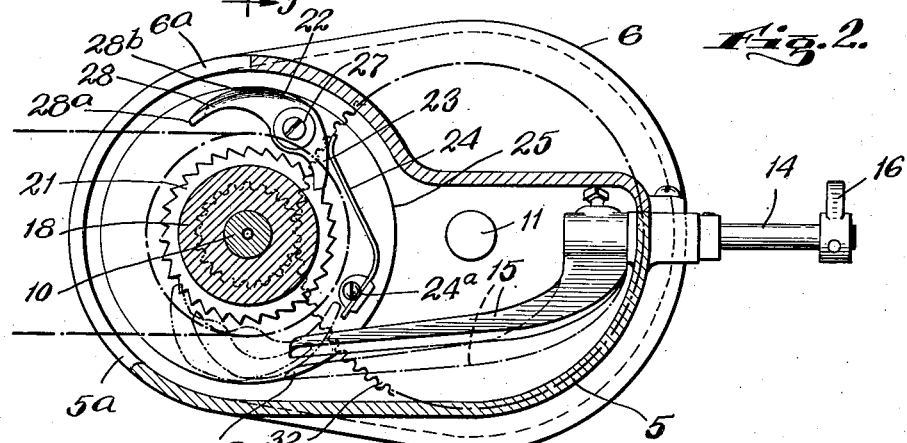
Fig. 2 is a longitudinal sectional view through a mechanism as seen in Fig. 1, substantially on the line 2—2 of Fig. 1.

In the present illustration it will appear that the sleeve 18 is rotating in an anti-clockwise direction, as will appear from a consideration of Fig. 2. However, this direction of drive may be varied by simply changing the position of the pawl and utilizing a ratchet wheel suitable therefore. Considering the drive mechanism generally, it will appear that it comprises a freely rotatable drive sleeve having a member for coupling the same with a drive, and a member adapted to provide a clutching engagement with a driven shaft through means fixed on the shaft, and further the driven shaft may be coupled with a suitable output, for example, through the medium of the supplemental driven shaft 11. However, the form and character of the output drive may be varied to suit different conditions and installations. From this standpoint, the use of gears is not absolutely essential.

Having fully described my invention, what I claim as new and desire to secure by Letters Patent, is:

1. An intermittent drive mechanism of the class described comprising a suitably supported driven shaft, a sleeve freely rotatable on said driven shaft, means on said sleeve placing the same in operative engagement with driving means, a clutch member comprising a ratchet wheel on said sleeve, an enlarged portion on said driven shaft arranged adjacent said clutch member, a substantially crescent-shaped clutch element pivoted centrally thereof to the enlarged portion of said driven shaft, one end of said crescent-shaped clutch element being adapted for operative engagement with said clutch member, a spring resiliently urging said last named end into engagement with said member, said clutch element being rotatable with the driven shaft, means movable into the path of rotary movement of said element for operative engagement with the outer surface of the other end portion thereof, and the engagement between said last named means and said element providing for the smooth retarding and stopping of the rotation of said driven shaft and the simultaneous pivotal movement of the first named end of said element out of engagement with said clutch member.

2. An intermittent drive mechanism of the class described comprising a suitably supported driven shaft, a sleeve freely rotatable on said driven shaft, means on said sleeve placing the same in operative engagement with driving means, a clutch member comprising a ratchet wheel on said sleeve, an enlarged portion on said driven shaft arranged adjacent said clutch member, a substantially crescent-shaped clutch element pivoted centrally thereof to the enlarged portion of said driven shaft, one end of said crescent-shaped clutch element having a shoulder at the extremity thereof for operative engagement with said clutch member when the latter is rotated toward the pivot of said element, a spring resiliently urging said last named end into engagement with said member, said clutch element being rotatable with the driven shaft, means movable into the path of rotary movement of said element for operative engagement with the outer surface of the other end portion thereof, and the engagement between said last named means and said element providing for the smooth retarding and stopping of the rotation of said driven shaft and the simultaneous pivotal movement of the first named end of said element out of engagement with said clutch member.

AXEL I. PEDERSEN.